United States Patent [19]

Freakley et al.

[11] Patent Number: 4,657,871

[45] Date of Patent: Apr. 14, 1987

[54] MIXING POLYMERS SUCH AS RUBBER

[76] Inventors: Philip K. Freakley, Southcroft, Victoria Road, Burbage, Leicestershire LE12 2JT; Bernard R. Matthews, 12 Truro Close, East Leake, Loughborough, Leicestershire LE12 6HB; Henry D. Giffin, 6 Riverside, Chadderton, Oldham, Lancashire OL1 2TX, all of England

[21] Appl. No.: 765,540

[22] Filed: Aug. 14, 1985

[30] Foreign Application Priority Data

Aug. 14, 1984 [GB] United Kingdom ............... 8420648

[51] Int. Cl.$^4$ .......................... C08F 2/00; G01N 35/00
[52] U.S. Cl. ......................................... 436/55; 73/54; 264/40.3; 264/40.6; 422/62; 422/224; 422/135; 436/85; 526/60; 526/88
[58] Field of Search ...................... 422/62; 436/55, 85; 366/76, 167; 425/143, 144, 145, 146, 149, 209; 264/40.3, 176, 40.6; 73/54, 56, 60; 526/60, 88

[56] References Cited

U.S. PATENT DOCUMENTS

| | | | |
|---|---|---|---|
| 3,053,079 | 9/1962 | Miller et al. | 73/60 |
| 3,447,201 | 6/1969 | Seanor et al. | 425/209 |
| 3,463,462 | 8/1969 | Sarff et al. | 73/54 |
| 3,493,345 | 2/1970 | Windley | 436/85 |
| 3,841,147 | 10/1974 | Coil et al. | 73/56 |
| 3,888,388 | 6/1975 | Mahoney | 425/145 |
| 4,281,288 | 7/1981 | Izumi | 73/54 |

FOREIGN PATENT DOCUMENTS 2084035 4/1982 United Kingdom .

*Primary Examiner*—Michael S. Marcus
*Attorney, Agent, or Firm*—Murray and Whisenhunt

[57] ABSTRACT

A method of mixing polymers, especially rubber by (i) deforming the polymer until it is estimated to attain a first predetermined viscosity, (ii) adding filler and deforming the polymer-and-filler mixture until it is estimated to attain a second predetermined viscosity, (iii) adding oil or plasticiser, and deforming and resulting mixture until it is estimated to attain a third predetermined viscosity, and then (iv) discharging the resulting mixture from the process, where the estimating of each predetermined viscosity is attained by measuring: (1) the mixing torque applied by a mixer during the process at last twice at a fixed mixer-rotor speed and corrected by a reference batch temperature; (2) the rate of change of the torque and (3) the time, or the deforming energy, necessary to reach the torque characteristic of the respective predetermined viscosity. In addition, the ram pressure applied to the mixing chamber is monitored and increased or decreased in response to the cyclic ram movement during mixing.

3 Claims, No Drawings

MIXING POLYMERS SUCH AS RUBBER

This invention relates to a process for mixing polymers such as rubber, allied elastomers, and similar compounds, and also for blends of such materials (for example a 50:50 blend of rubber and poly(vinyl chloride)), and for any material which changes its viscosity according to how much it is deformed. The invention may be used for instance for mixing rubber with additives, especially where a maximum temperature must not be exceeded. It can also be used to initiate the addition of additives such as fillers after polymers have started to gel.

At present, rubber is often mixed in several stages. Thus, raw rubber may be masticated in a mixer, then discharged, then re-fed to the mixer for adding carbon black to the masticated rubber, then again re-fed to the mixer for adding cross-linking agents and so on. The inconvenience of this procedure has led to proposals to perform all these steps without such re-feeding. Such proposals, however, have hitherto required slow mixing or a variable-speed mixer. For example, U.S. Pat. No. 3,447,201 (Adamson United Company) teaches the use of a mixer in which a variable-speed motor drives intermeshing rotors to effect the mixing and in which, in response to the monitored temperature and motor torque, the motor speed is changed. UK Patent Application No. GB 2084035A (Werner & Pfleiderer) teaches a mixing sequence controlled on the basis of energy marks and a superimposed desired/actual value follower control of the mixing temperature via the specific energy supplied to the mixture, the paddle speed and/or the plunger pressure serving as manipulated variables for the temperature.

Fixed-speed-drive mixers cannot be controlled to keep the mixture at or near a target temperature, and the only remaining suitable parameter would be the ram pressure, that is, the pressure of the ram which pushes the mixture into the (for example) intermeshing rotors. The danger with reducing ram pressure is that the batch could excessively displace the ram and hence move into regions of stagnation, giving substantial in-batch variation. Some cyclic movement of the ram is however usual as the rotors rotate.

In one aspect, therefore, the invention provides a process for mixing in a chamber, to which resilient pressure is applied by a ram, characterised in that the movement of the ram during mixing is monitored and the ram pressure is increased when the monitored movement is excessive compared with a maximum permissible movement predetermined for that chamber. Optionally the ram pressure is also capable of being reduced during the process (in appropriate circumstances, such as excessive temperature rise).

Viscosity of the mixture is commonly taken to be proportional to the torque applied by the motor. However, we have found that a reliable measure of viscosity also requires the torque to be measured at a reference speed as well as being corrected for the difference between actual batch temperature and a reference temperature. The torque is commonly taken as (motor power)-(motor speed). When the batch temperature at some instant is not the reference temperature, an equation relating viscosity to batch temperature can be used to make the necessary correction. The constants of this equation must be deduced by off-line testing. Although the word 'viscosity' is used throughout to described the flow behaviour of a polymer, it is to be understood that the measurement of torque during deformation may derive from visco-elastic behaviour.

The present invention is intended to permit one-stage polymer mixing, or more productive use of sequential stage mixing with a variable-speed rotor, thanks to a new approach to the estimation of when a prescribed viscosity is being attained by the mixture. With a fixed-speed rotor, the invention offers the prospect of more uniform mixtures.

According to another aspect of the present invention, a process for mixing polymer comprises deforming: polymer(s); or a mixture of polymer(s) and (an)other ingredient(s); or a mixture of other ingredients; until it is estimated to attain a predetermined viscosity, characterised in that the attainment of the predetermined viscosity is estimated as follows: the mixing torque applied by the mixer is measured at least twice at a fixed mixer-rotor speed and corrected to a reference batch temperature; the rate of change of the torque is determined; the time, or the deforming energy, to reach the torque characteristic of the respective predetermined viscosity is predicted by extrapolation; and the deforming is continued for the predicted time or energy, the process optionally being further characterised in that all the, or the last of the, other ingredient(s) which when all present promote cross-linking, is/are added to the mixture at a predetermined length of time before the predetermined viscosity is estimated to be attained.

Also according to the present invention, a polymer mixer comprises means (such as a fixed- or variable-speed rotor) for deforming: deforming polymer(s); or a mixture of polymer(s) and (an)other ingredient(s); or a mixture of other ingredients; until it is estimated to attain a predetermined viscosity, characterised in that the attainment of the predetermined viscosity is estimated as follows: the mixing torque applied by the mixer is measured at least twice at a fixed mixer-rotor speed and corrected to a reference batch temperature; the rate of change of the torque is determined; the time, or the deforming energy, to reach the torque characteristic of the respective predetermined viscosity is predicted by extrapolation; and the deforming is continued for the predicted time or energy, the mixer optionally being further characterised in that all the, or the last of the, other ingredient(s) which when all present promote cross-linking, is/are added to the mixture at a predetermined length of time before the predetermined viscosity is estimated to be attained.

In the method, the mixture of polymer (e.g. rubber) and other ingredient(s) (e.g. oil, so-called vulcanising system, plasticiser and filler) may be arrived at in any order. Thus a physical blend of some or all the other ingredients may be mixed with the rubber, or the polymer may be deformed and oil and filler and plasticiser added in any order or any two or more together with deforming between each adding, any one or more (e.g. all) of the deformings continuing until a respective predetermined viscosity is estimated to be attained as set forth above.

Thus in one method according to the present invention, a process for mixing rubber comprises:

(i) deforming raw rubber(s) until it is estimated to attain a first predetermined viscosity, then (ii) adding filler(s) and deforming the rubber(s)-and-filler(s) mixture until it is estimated to attain a second predetermined viscosity, then (iii) adding oil or plasticiser, and deforming the resulting mixture until it is estimated to attain a third predetermined viscosity, then (iv) discharging the resulting mixture from the process, characterised in that the attainment of each predetermined viscosity is estimated as follows: the mixing torque applied by the mixer is measured at least twice at a fixed mixer-rotor speed and corrected to a reference batch temperature; the rate of change of the torque is determined; the time, or the deforming energy, to reach the torque characteristic of the respective predetermined viscosity is predicted by extrapolation; and the deforming is continued for the predicted time or energy, the process being further characterised in that, at a predetermined length of time before step (iii) is completed, said predetermined length of time constituting a stage, all the, or the last of the, additive(s) which when all present promote cross-linking is/are added to the mixture at the instant defining the start of the said stage.

Alternatively, the attainment of any one or more of the predetermined viscosities (especially if the polymer viscosity is unaffected by deformation) may be estimated by comparing the actual viscosity with the predetermined viscosity, or with a target viscosity adjusted for time and/or energy and/or temperature from the predetermined viscosity, and during the same or a subsequent step adding oil, plasticiser or other viscosity-affecting chemical in a quantity determined by the comparison.

The ram pressure control set forth above may be used in conjunction with any of these aspects of the invention.

The word "deforming" is used because "mixing" does not fully express the action performed on the material, but we continue to call the apparatus the "mixer", according to normal usage.

Since the material may be spoiled if allowed to become too hot, and since heating is a direct result of deforming, preferably the rate of deforming is so controlled that a maximum temperature predetermined independently for each combination of batch components, (thus for example independently for each stage of each step (i) to (iii)) is not exceeded.

The cross-linking agent (also known as curative) takes effect, in conjunction with the other components of the cross-linking system such as initiators and accelerators, in a curing step, well after the process set forth above. However, control of the curing step is simplified if each batch can be given the same temperature and duration of curing treatment, and this in turn requires that each batch has had the same thermal history *from* the instant of adding all the, or the last of the, additive(s) which when all present promote cross-linking *to* the instant of entering the curing step. The step of deforming the rubber/cross-linking agent mixture is very significant in this, because of the elevated temperature at which this is typically done, whereby a certain amount of progress towards the cross-linking reaction is expected to occur during this step. Thus, in the case of a variable-speed rotor, for the purpose of ensuring a consistent thermal history of the cross-linking agents from batch to batch, their mixing should continue always for a constant time, at a reasonably constant temperature, or at a constant integrated temperature with respect to time, so that the deforming after all the cross-linking system is present (step (iii) in the example) ends at the predetermined viscosity. In the less preferred case of a fixed speed rotor, on the other hand, a similar purpose may be at least approached in that all the, or the last of the, additive(s) which when all present promote cross-linking are added at an instant giving for its mixing always a constant integrated temperature with respect to time. The duration of that part of step (iii) before the (last of the) cross-linking promoting additive(s) is/are added is adjusted accordingly so that step (iii) (i.e. that stage) will on average end at the predetermined viscosity.

The variable-speed rotor version is preferred for a further reason, namely that it can be exploited to put the required energy into the mixture as quickly as possible without its exceeding any required maximum temperature, and hence at lowest overall cost. This can also be useful, to ensure that the polymers have a sufficiently high viscosity to transmit mixing forces to fracture agglomerates of filler particles to a sufficiently fine size distribution. Thus, the rotor speed is preferably continuously adjusted to maintain a target batch temperature, and this temperature is preferably as close as may be dared to the said maximum temperature.

Turning to the ram pressure control set forth above, precise batch temperature control cannot be achieved with fixed-speed mixers, although it is well known that reducing ram pressure can significantly reduce the rate of temperature rise in the latter parts of a mixing cycle. The danger with reducing ram pressure is that the batch will displace the ram and hence move into regions of stagnation, giving substantial in-batch variation. To avoid this according to the invention, one possibility is a closed-loop control system designed to ensure that the ram exerts the minimum pressure necessary to keep the batch in regions where it is actively mixed at all times. Some cyclic movement of the ram is expected, due to the action of the rotors on the batch, so the set-point chosen for the system in this example is a mean ram displacement. The set-point is determined by the geometry of the rotors and the mixing chamber and is factory-preset, not adjustable by the user. A continuous record of ram position (from a linear displacement transducer) can then be averaged for a specified time period, and is compared with the set-point. The error signal is fed to a control algorithm to alter a compressed-air regulating valve which adjusts ram pressure, so that this pressure is always adequate to keep all regions of the batch actively mixed at all times. The pressure is applied to the ram by compressed-air, as compressed liquid would not permit the ram to be displaced against the pressure which is applying. This system can also be used in conjunction with the rotor speed batch temperature control described for variable speed mixers.

In typical rubber mixing, quantities of oil, plasticiser, accelerator and retarder are added, these collectively being known sometimes as "small powders". The alternative method set forth above for estimating the attainment of a predetermined viscosity exploits these additions, by varying the quantity added to arrive at the required viscosity. It is possible to compile a table of the viscosity (at a reference temperature and speed) of an ideal mixture of rubber at any stage in its mixing process, and to adjust the quantity or relative proportions of small powders added to a real mixture at some particular stage in its mixing so as to alter its actual viscosity (corrected to a reference temperature and speed) to the viscosity which the ideal mixture would have at the corresponding stage of its mixing. Thus the (corrected) viscosity of a polymer would be determined during initial deformation in the mixer of polymer without other ingredients, and compared with the viscosity of ideal polymer at the corresponding instant during its deformation. From off-line tests, the relationship is determined of the concentration of oil, plasticiser or other viscosity-affecting chemical to the viscosity. The quantity of such chemical to be added is calculated from the viscosity comparison using this relationship. Indeed, although many rubbers become less viscous with mastication, some do not, and with the latter this method of adjusting the viscosity is to be preferred. A combination of this method and the previously described mastication method may also be preferred in appropriate cases.

A process as set forth above can therefore achieve a substantially higher level of in-batch and batch-to-batch uniformity than has hitherto been possible. It is desirable to produce, consistently, batches of mixed compound with flow and cross-linking characteristics both of which conform closely to prescribed values, to enable the productivity of downstream processes to be optimised and the performance of the ultimate (e.g.vulcanised) products to be enhanced. Such a process can be used as a basis to maximise the output from an internal mixer and/or to minimise the unit cost of mixing (per unit volume of mixed compound). The efficiency with which these objectives can be achieved will be enhanced if the process set forth above is used in conjunction with the techniques collectively known as 'evolutionary operation'. The process is highly suitable for computer control.

When a compound has not been mixed previously and there are no mixing cycles for similar compounds in the computer files, it is best to create a new mixing cycle specification through a set-up procedure. Since the user cannot specify torque/viscosity targets directly, the mixing cycle is based simply on time or energy, which convert into target viscosities/torques and for which measurement instants may be chosen using an appropriate computer programme. Target temperature would be set manually from a knowledge of the temperature-sensitive ingredients in the polymer mixture, as would the time of addition of the (last of the) cross-linking system before the end of the mixing cycle.

The set-up procedure would give, with some experimentation, a mixing cycle capable of consistently achieving the desired mixed material properties. Progressive adjustment of set-points through evolutionary operation would then move the process towards optimum productivity.

We claim:

1. A process for mixing rubber, said process comprising the steps of:
   (i) deforming raw rubber in a mixer under pressure applied by a resilient ram until said rubber is estimated to attain a first predetermined viscosity, then
   (ii) adding filler and deforming the resulting rubber-filler mixture under pressure applied by said ram until the rubber-filler mixture is estimated to attain a second predetermined viscosity, then
   (iii) adding oil or plasticizer, and deforming the resulting mixture under pressure applied by said ram until the mixture is estimated to attain a third predetermined viscosity, then
   (iv) at a predetermined length of time before step (iii) is completed, adding to the mixture all of, or the last of, an additive which when all present promotes cross-linking, then
   (v) discharging the resulting mixture from the process, the attainment of each said predetermined viscosity being estimated by:
   measuring at least twice a mixing torque applied by said mixer at a fixed mixer-rotor speed and correcting to a reference batch temperature;
   determining the rate of change of said mixing torque;
   predicting the time or deforming energy to reach a torque characteristic of the respective predetermined viscosity; and
   continuing said deforming for said predicted time or predicted deforming energy;
   said process further including monitoring cyclic movement of said ram during mixing and increasing the ram pressure when the monitored cyclic movement is excessive compared with a maximum permissible movement predetermined for the process.

2. A process according to claim 1, wherein the ram pressure is also capable of being reduced in the process.

3. A process for mixing rubber, said process comprising the steps of:
   (i) deforming raw rubber under pressure applied by a resilient ram until said rubber is estimated to attain a first predetermined viscosity, then
   (ii) adding filler and deforming the resulting rubber-filler mixture under pressure applied by said ram until said rubber-filler mixture is estimated to attain a second predetermined viscosity, then
   (iii) adding oil or plasticizer and deforming the resulting mixture under pressure applied by said ram until the mixture is estimated to attain a third predetermined viscosity, then
   (iv) at a predetermined length of time before step (iii) is completed adding to the mixture all of, or the last of, additives which affect the viscosity of the mixture in a quantity determined by comparison as appropriate for attaining the predetermined viscosity, then
   (v) discharging the resulting mixture from the process, the attainment of each said predetermined viscosity being estimated by comparing the actual viscosity with a predetermined viscosity or with a target viscosity adjusted for time and/or temperature from the predetermined viscosity,
   said process further including monitoring cyclic movement of said ram during mixing, and increasing the ram pressure when the monitored cyclic movement is excessive compared with a maximum permissible movement predetermined for the process.

* * * * *